(12) United States Patent
Martinsson

(10) Patent No.: US 10,149,434 B2
(45) Date of Patent: Dec. 11, 2018

(54) DUAL DIRECTION CUTTING DEVICE

(71) Applicant: HUSQVARNA AB, Huskvarna (SE)

(72) Inventor: Pär Martinsson, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 15/100,786

(22) PCT Filed: Dec. 2, 2013

(86) PCT No.: PCT/SE2013/051429
§ 371 (c)(1),
(2) Date: Jun. 1, 2016

(87) PCT Pub. No.: WO2015/084220
PCT Pub. Date: Jun. 11, 2015

(65) Prior Publication Data
US 2016/0302355 A1   Oct. 20, 2016

(51) Int. Cl.
| | | |
|---|---|---|
| *A01D 34/73* | (2006.01) | |
| *A01D 34/90* | (2006.01) | |
| *A01D 34/78* | (2006.01) | |
| *A01D 34/84* | (2006.01) | |

(52) U.S. Cl.
CPC .............. *A01D 34/73* (2013.01); *A01D 34/78* (2013.01); *A01D 34/84* (2013.01); *A01D 34/90* (2013.01)

(58) Field of Classification Search
CPC ........ A01D 34/73; A01D 34/78; A01D 34/84; A01D 34/90
See application file for complete search history.

(56) References Cited

U.S. PATENT DOCUMENTS

| | | | | |
|---|---|---|---|---|
| 3,482,380 A | * | 12/1969 | Stair .................... | A01D 34/736 144/34.1 |
| 3,781,991 A | * | 1/1974 | Stretton ............... | A01D 34/902 30/276 |
| 4,250,621 A | * | 2/1981 | Houle .................... | A01D 34/73 30/347 |

(Continued)

FOREIGN PATENT DOCUMENTS

| | | |
|---|---|---|
| CN | 201518584 U | 7/2010 |
| EP | 1364571 A2 | 11/2003 |

(Continued)

OTHER PUBLICATIONS

International Search Report and Written Opinion of PCT/SE20131051429 dated Aug. 8, 2014.

*Primary Examiner* — Hwei C Payer
(74) *Attorney, Agent, or Firm* — McNair Law Firm, P.A.

(57) ABSTRACT

A hand-held cutting device may include a working assembly, a motor and a control assembly. The working assembly may be configured to be rotatable in a first direction and a second direction to perform a first function when rotated in the first direction and a second function, different from the first function, when rotated in the second direction. The motor may be operably coupled to the working assembly to rotate the working assembly. The control assembly may be operably coupled to the motor to enable an operator of the device to select a rotation direction for the working assembly. The working assembly may be configured to perform the first and second functions using a single blade assembly.

13 Claims, 5 Drawing Sheets

(56) References Cited

U.S. PATENT DOCUMENTS

| | | | | |
|---|---|---|---|---|
| 4,310,999 | A * | 1/1982 | Onoue | A01D 34/73 30/347 |
| 4,368,610 | A * | 1/1983 | Aono | A01D 34/73 30/347 |
| 4,527,382 | A * | 7/1985 | Aono | A01D 34/73 30/347 |
| 5,265,341 | A * | 11/1993 | Kikuchi | A01D 34/902 30/276 |
| 5,452,569 | A * | 9/1995 | Anderson | A01D 34/73 56/295 |
| 5,809,653 | A * | 9/1998 | Everts | A01D 34/90 15/328 |
| 5,899,053 | A * | 5/1999 | Roth | A01D 34/73 56/255 |
| 5,901,481 | A * | 5/1999 | Simmons | D06F 75/20 38/88 |
| D458,279 | S * | 6/2002 | Blakeslee | D15/28 |
| 6,446,346 | B1 * | 9/2002 | Castleman | A01D 34/416 30/276 |
| D493,476 | S * | 7/2004 | Apfel | D15/139 |
| 7,104,883 | B2 * | 9/2006 | Dow | A01F 12/40 460/112 |
| 9,049,816 | B2 * | 6/2015 | Ito | A01D 34/902 |
| 2006/0248731 | A1 * | 11/2006 | Suzuki | A01D 34/90 30/276 |
| 2009/0223193 | A1 * | 9/2009 | Funnell | A01D 34/73 56/17.5 |
| 2010/0313430 | A1 | 12/2010 | Yamaoka et al. | |
| 2011/0203118 | A1 * | 8/2011 | Saito | A01D 34/902 30/276 |
| 2011/0232436 | A1 | 9/2011 | Morabit | |
| 2013/0099039 | A1 | 4/2013 | Gaudreault | |
| 2016/0302355 | A1 * | 10/2016 | Martinsson | A01D 34/73 |

FOREIGN PATENT DOCUMENTS

| | | |
|---|---|---|
| EP | 2044829 A1 | 4/2009 |
| JP | H09233929 A | 9/1997 |
| JP | H10127135 A | 5/1998 |
| JP | 2002084852 A | 3/2002 |
| JP | 2006314277 A | 11/2006 |
| WO | 9941966 A1 | 8/1999 |
| WO | 2010151871 A2 | 12/2010 |
| WO | 2013032374 A1 | 3/2013 |
| WO | 2013062457 A1 | 5/2013 |

* cited by examiner

DUAL DIRECTION CUTTING DEVICE

TECHNICAL FIELD

Example embodiments generally relate to an outdoor power device that is electric powered and, more particularly, relate to a cutting device that can be rotated in different directions to achieve different functions or apply different cutting surfaces.

BACKGROUND

Handheld outdoor power devices such as trimmers, blowers, chainsaws, and/or the like, are often used to perform tasks relating to yard/grounds maintenance or even commercial resource harvesting activities that require them to be mobile. Although there are several options for powering such devices, including combustion engines, corded electric motors, or battery powered electric motors, each option may be viewed as having advantages in certain environments and for certain users.

An advantage of battery powered electric motors and combustion engines is that the corresponding devices can be freely operated without concern for cutting a cord accidentally, and without range limitations provided by the cord. Such devices have therefore proven to be popular for many different tasks. However, it has been common for such devices to be specialized to a particular function (e.g., trimming, blowing, sawing, etc.), so that different devices may be employed for corresponding different functions.

To improve upon this situation, devices were developed that allow different attachments to be placed on the working end of such devices. Accordingly, for example, different work assembly attachments could be installed on such devices. However, the installation of different work assembly attachments can be cumbersome and complicated for some users.

BRIEF SUMMARY OF SOME EXAMPLES

Some example embodiments may therefore provide a cutting device that can change functions or cutting surfaces without requiring disassembly/reassembly of various parts of the device. Indeed, quite to the contrary, the function or cutting surface of some example embodiments may be changed merely by operating a switch. Moreover, some example embodiments may enable the function change to be accomplished by simply operating the device with a different rotational direction. As such, for example, different functions or blades may be accessed by rotating the working assembly in respective different directions. Accordingly, some embodiments may provide for the provision of a dual direction, multi functional cutting device.

In one example embodiment, a hand-held cutting device is provided. The device may include a working assembly, a motor and a control assembly. The working assembly may be configured to be rotatable in a first direction and a second direction to perform a first function when rotated in the first direction and a second function, different from the first function, when rotated in the second direction. The motor may be operably coupled to the working assembly to rotate the working assembly. The control assembly may be operably coupled to the motor to enable an operator of the device to select a rotation direction for the working assembly. The working assembly may be configured to perform the first and second functions using a single blade assembly.

In another example embodiment, a blade assembly for a hand-held cutting device is provided. The blade assembly may include a main body portion, a first edge portion and a second edge portion. The main body portion may engage with the device to facilitate turning of the blade assembly to perform first function when the blade assembly is rotated in the first direction and a second function, different from the first function, when rotated in the second direction. The first edge portion may extend from the main body portion and may be oriented to perform the first function responsive to rotation of the main body portion in the first direction. The second edge portion may extend from the main body portion and may be oriented to perform the second function responsive to rotation of the main body portion in the second direction.

In accordance with another example embodiment, a hand-held cutting device having different cutting blades employed dependent upon the direction of rotation of the device is provided. The device may include a working assembly configured to be rotatable in a first direction and a second direction. The working assembly may include a blade assembly having a first cutting edge oriented to be a leading edge of the working assembly responsive to rotation of the working assembly in the first direction and a second cutting edge oriented to be a leading edge of the working assembly responsive to rotation of the working assembly in the second direction. The device may further include a motor operably coupled to the working assembly to rotate the working assembly, and a control assembly operably coupled to the motor to enable an operator of the device to select a rotation direction for the working assembly. The first and second cutting edges are different from each other.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
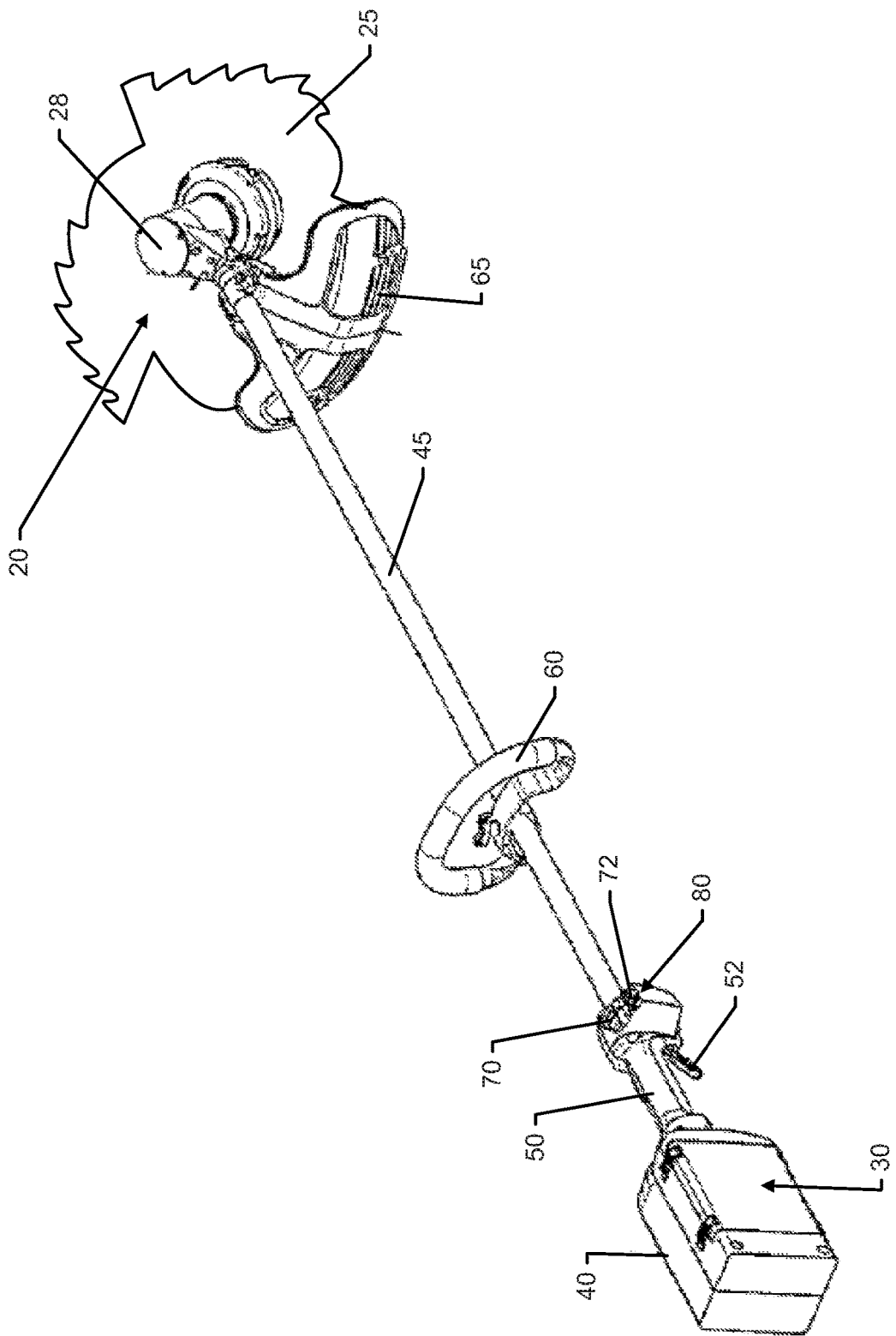
FIG. 1 illustrates a perspective view of an electric powered trimmer that may be configured in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. One of skill in the art will appreciate the normal position in which devices of example embodiments are held for operation and that the working assembly represents the front of such devices. All other directional references should be understood in this general context.

Some example embodiments described herein provide a dual direction, multi functional cutting device. In this regard, some embodiments may employ a work assembly (e.g., a cutting head) that can turn in either a clockwise or a counterclockwise direction by simply operating a switch. Meanwhile, for example, a different function may be achieved with each different direction of operation. As such, again for example, a saw function may be accomplished by operating the device in a clockwise direction and a trimming function may be accomplished by operating the device in a counterclockwise direction. In some cases, the work assembly or cutting head may include a single blade assembly that is fashioned to include two different blades or blade-types so that the blade assembly can perform one operation while turning in a first direction and perform a different functional operation when turning in a second direction. Thus, example embodiments provide for a multi-functional cutting device that can change functions without requiring disassembly/reassembly of various parts of the device.

Figure 2:
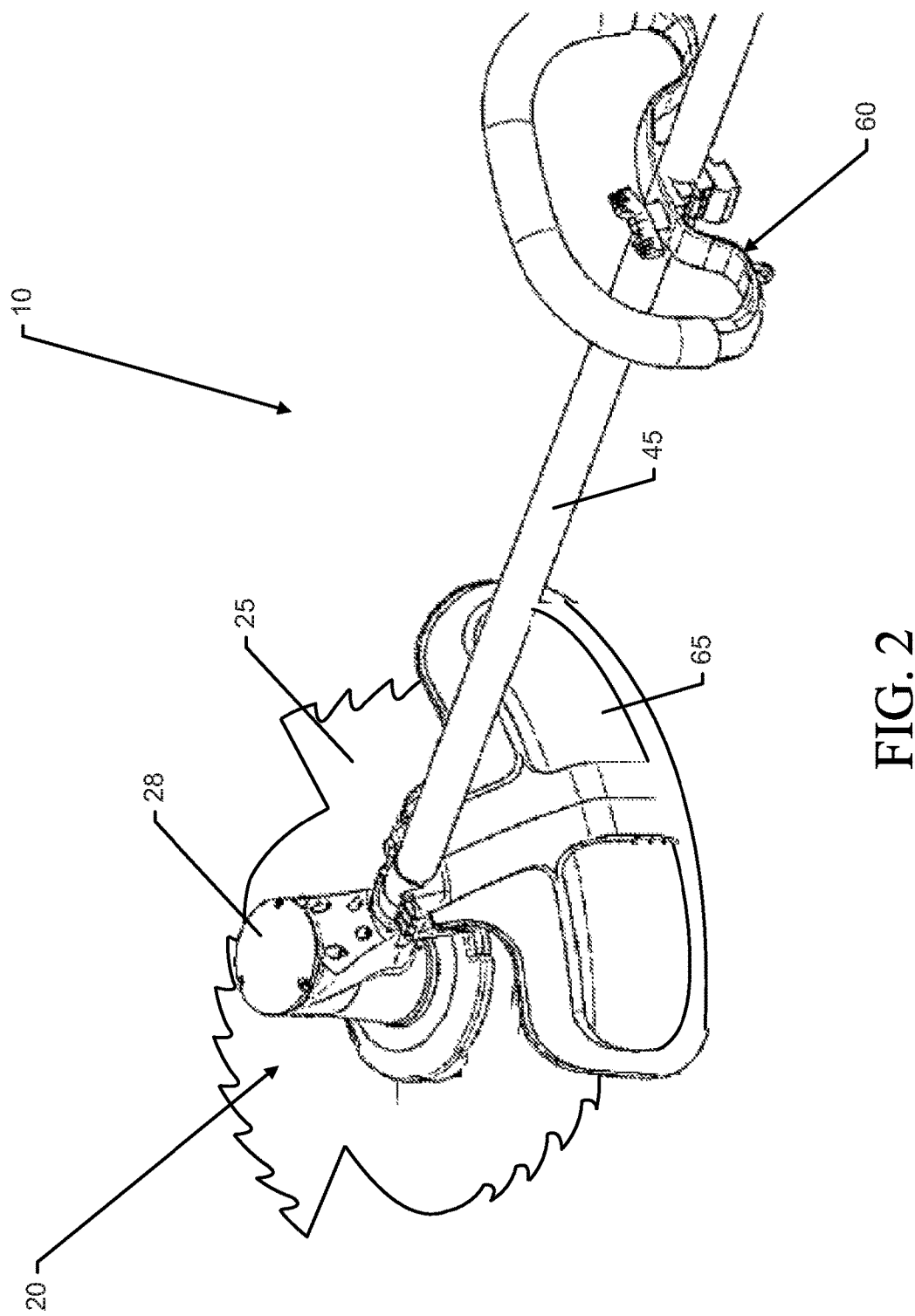
FIG. 2 illustrates a close-up perspective view of a work assembly of the trimmer according to an example embodiment.

Referring to the drawings, FIGS. 1 and 2 show an electric powered trimmer 10 that may be configured in accordance with an example embodiment. However, it should be appreciated that the trimmer 10 is merely one example of an electric powered, outdoor power device that may be configured in accordance with an example embodiment. Thus, for example, some embodiments may be practiced in connection with other outdoor power devices such as edgers, brush cutters, and/or the like. It should also be appreciated that the trimmer 10 of FIGS. 1 and 2 is a battery powered device. However, example embodiments could alternatively be employed in connection with corded versions of various electric powered, outdoor power devices. Moreover, in some cases, example embodiments could also be practiced in connection with combustion engines that are configured to enable conversion of the direction that the output shaft turns. Thus, although an example embodiment will be described hereinafter with specific reference to the battery powered trimmer 10 of FIGS. 1 and 2, the applicability of alternative embodiments relative to other types of devices should be well understood.

As shown in FIGS. 1 and 2, the trimmer 10 may include a working implement or working assembly 20, which in this example includes a rotatable cutting blade assembly 25. The working assembly 20 may further include a motor (e.g., an electric motor) disposed in a housing 28 of the working assembly 20. The working assembly 20 may also include a latch assembly configured to enable the working assembly 20 to grasp and/or hold the blade assembly 25 during rotation thereof. In some embodiments, the latch assembly may include one or more of a buckle, rod, pin, clamp, or other fastening device that is configured to hold the blade assembly 25 in place during rotation of the working assembly 20. In some embodiments, the blade assembly 25 may be clamped between an adapter of the working assembly 20 and a washer by a nut that is torqued to a relatively high value. In such an embodiment, the blade assembly 25 may have a round hole in center thereof, and the blade assembly 25 may be passed over a portion of the shaft (or extension thereof) and attached thereon by the clamping described above. Given that the working assembly 20 of an example embodiment can rotate in opposite directions (e.g., clockwise and counterclockwise), the latch assembly of some embodiments may be designed to avoid the use of threaded fasteners.

The motor of the trimmer 10 may be powered, according to this example, by a battery pack 30. The battery pack 30 is received into a battery compartment of the trimmer 10. The battery compartment may be a recess or cavity formed in a casing 40 of the trimmer 10 disposed at one end of an elongated member 45 that may further include the working assembly 20 at an opposite end thereof. The elongated member 45 may be a hollow tube, pipe, rod or other such member that may be straight or curved in different embodiments. The elongated member 45 may provide operable communication between the working assembly 20 and the battery pack 30 so that the battery pack 30 can power the working assembly 20. In some embodiments, the casing 40 may be formed from one or more plastic or other rigid components that may be molded to have a desired shape. The casing 40 may substantially enclose the battery compartment, control circuitry and/or other components associated with powering and/or controlling the operation of the trimmer 10. However, it should also be appreciated that the battery pack of some alternative embodiments may be housed within a backpack that may be worn on the operator's back. In such an example, the battery pack may be connected to the trimmer 10 via a cord or other adaptor.

In an example embodiment, the trimmer 10 may include a rear handle 50 and a front handle 60. The rear handle 50 may be disposed in-line with the elongated member 45 proximate to the casing 40, while the front handle 60 may be disposed between the casing 40 and the working assembly 20 at an interior portion of the elongated member 45. An operator of the trimmer 10 may use one hand to hold the front handle 60 and the other hand to hold the rear handle 50 while operating the trimmer 10. In some embodiments, the rear handle 50 may include a trigger 52 or other control mechanism for engaging operation of the motor to power the working assembly 20. Although FIG. 1 shows the front handle 60 being positioned forward of the rear handle 50 along the elongated member 45, it should also be appreciated that other arrangements for holding and operating the trimmer 10 may be provided. For example, in some cases, a "handlebar" embodiment may be provided in which the front and rear handles 60/50 are replaced by a single handle assembly attached to the elongated member 45 where both handles on the handle assembly are substantially equidistant from the working assembly 20 and disposed spaced apart from the elongated member 45 on opposites sides thereof on a handlebar assembly. Other arrangements are also possible.

The trimmer 10 may further employ a trim shield 65 that is configured to prevent cut materials and/or debris from coming back at the operator. In an example embodiment, the trim shield 65 may be configured to be substantially symmetrical relative to an axis defined by the elongated member. Thus, regardless of the direction of rotation of the motor (and therefore also the blade assembly 25), the clippings/debris will be directed substantially perpendicularly with respect to the axis to a corresponding side of the trimmer 10 based on which direction the motor is turning. The direction that cut materials travel when they are ejected by operation of the blade assembly 25 may therefore be at least partially controlled by the direction of rotation, but may also be influenced by the trim shield 65.

In an example embodiment, the motor may be a DC motor or a brushless DC motor (BLDC) that is powered by the battery pack 30. The motor may be configured to turn in either the clockwise or counterclockwise direction based on a switch position of a directional switch 70 disposed at a portion of the casing 40, at one of the handles, or at another portion of the trimmer 10. In the example of FIGS. 1 and 2, the directional switch 70 may be provided at a control panel or control assembly 80 that may be positioned proximate to the rear handle 50. However, the control assembly 80 could be positioned at any of a number of other locations on the trimmer 10 in alternative embodiments.

The repositioning of the directional switch 70 may cause a direction of rotation of the fields applied in the BLDC to reverse so that the direction of rotation can correspondingly be altered to go in either desired direction. Arrows A and B illustrate a first direction (e.g., counterclockwise) and a second direction (e.g., clockwise), respectively, in which the working assembly 20 may be configured to rotate. It should be understood that the housing 28 may further house a rotatable shaft that may extend through the blade assembly 25 to engage the blade assembly 25 (e.g., via the latch assembly). The rotatable shaft may turn in either the clockwise or counterclockwise direction based on operator selection of the direction (e.g., via directional switch 70) or selection of a function as described below. Thus, the direction of rotation of the shaft may be changeable by operator selection.

As an alternative to the use of a BLDC and the changing of the direction of rotating fields to cause changes in direction of the rotation of the rotatable shaft, mechanical methods of instituting direction changes may be implemented. For example, in some cases, a transmission or gearbox may be employed and one or more such gears may be repositioned based on a direction change selection made by the operator at the control assembly 80. The transmission or gearbox may be designed to convert speed and torque of the motor to rotation of the rotatable shaft in a desired direction, which may in turn also cause changes in the direction in which the blade assembly 25 is rotated.

In some embodiments, a speed of the rotation of the motor may also be controlled using a switching mechanism. For example, speed switch 72 may be provided on the casing 40 to enable the operator to select one of a predetermined number of speed settings that may control the application of an electric field within the motor to control speed of rotation of the motor and therefore also the working assembly 20. The speed switch 72 may include settings for speed levels such as low, medium, high, or any desirable speed. The trigger 52 may then control the on/off function for rotation of the working assembly 20 in a direction determined by the directional switch 70. Accordingly, the operator may be enabled to control the direction of rotation of the working assembly 20 and the speed of rotation of the working assembly 20. The decisions regarding speed and/or direction may depend upon the function that the operator wishes to engage for the trimmer 10 since, as indicated above, the trimmer 10 may be configured to support multiple functions.

Figure 3:
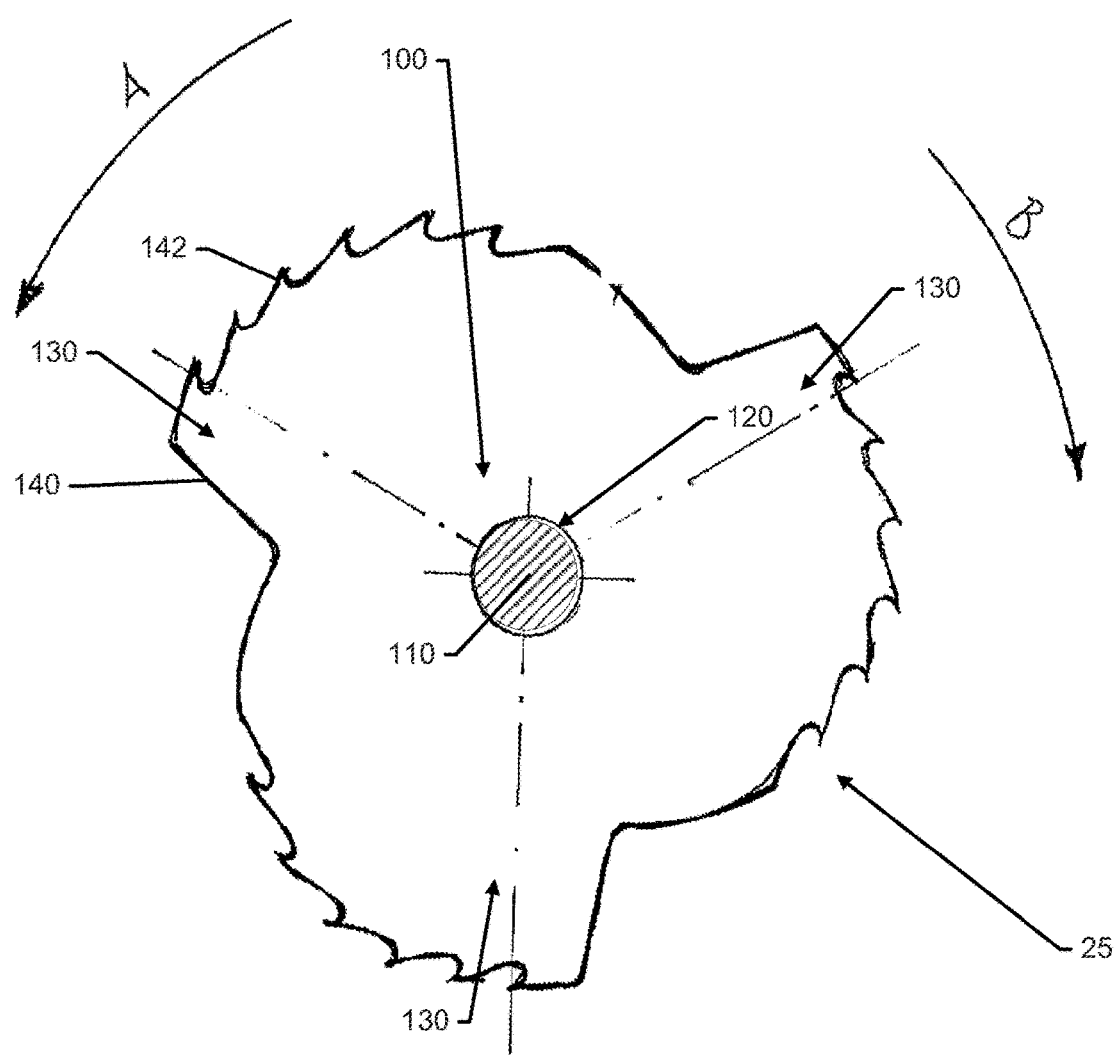
FIG. 3 illustrates a top, plan view of a blade assembly of the work assembly of FIGS. 1 and 2 in order to illustrate features of the blade according to an example embodiment.

In an example embodiment, the multiple functions may be supported by providing a different cutting surface or different functional operating surface on respective different portions of the blade assembly 25. Thus, for example, the blade assembly 25 may be provided as a multi-functional blade that is configured to perform one function when turned in one direction, and another function when turned in the opposite direction based at least in part on the structure of the blade itself. FIG. 3 illustrates an example of the blade assembly 25 of an example embodiment to more clearly illustrate some of the features of the blade assembly 25. In this regard, the blade assembly 25 may include a main body portion 100 for engagement with a shaft 110 of the trimmer 10. In FIG. 3, the shaft 110 is substantially cylindrical so that a receiving slot 120 formed at a center of the main body portion 100 may be round to accommodate the shaft 110. However, in an alternative embodiment, the receiving slot 120 may have another shape (e.g., a key shape, a rectangular shape, star shape, etc.) to facilitate turning of the blade assembly 25 responsive to turning of the shaft 110 by the motor in order to perform a desired type of cutting function. In an example embodiment, the latch assembly described above may engage the shaft 110 and/or a portion of the main body portion 100 proximate to the receiving slot 120. In some cases, the receiving slot 120 may be configured to enable the main body portion 100 to be turned in either the first direction or the second direction (e.g., by the shaft 110) without loosening a connection between the main body portion 100 and the shaft 110.

In an example embodiment, the main body portion 100 may include two or more blade portions 130 extending radially outwardly from a periphery of the main body portion 100. The blade portions 130 may lie substantially in a same plane as the main body portion 100. However, in some cases, one or more parts of the blade portions 130 may extend out of the plane, dependent upon the function and structure of the respective parts of the blade portions 130. In some cases, each blade portion 130 may include a respective first edge portion 140 (e.g., a first cutting edge) and second edge portion 142 (e.g., a second cutting edge). The first and second edge portions 140, 142 may be disposed on opposite sides of the blade portions 130 and each such portion may be configured and structured differently to facilitate execution of a corresponding different function when the blade assembly 25 is rotated in a corresponding opposite direction. Thus, for example, the first edge portion 140 may be associated with performance of a first function when the blade assembly 25 is rotated in the first direction (counterclockwise). The second edge portion 142 may be associated with performance of a second function when the blade assembly 25 is rotated in the second direction (clockwise). The second function may be a different type of cutting function from the first function. For example, the first function may be a relatively light duty, cutting or trimming function, while the second function may be a heavy duty, cutting or sawing function. Thus, for example, the first edge portion 140 may be a straight blade forming a knife edge for trimming or cutting grass or other vegetation that does not have a thick stalk or bark. Meanwhile, the second edge portion 142 may be a saw blade or a blade having teeth or other jagged cutting surfaces to facilitate cutting of thicker or heavier vegetation.

The first edge portion 140 may extend from the main body portion 100 substantially in a radially outward direction, and may be oriented to perform the first function responsive to rotation of the main body portion 100 in the first direction. The second edge portion 142 may extend from the main body portion 100 substantially in a radially outward direction, and may be oriented to perform the second function responsive to rotation of the main body portion 100 in the second direction. The first edge portion 140 may be the leading edge (and cutting edge) that engages material when the main body portion 100 is rotated in the first direction. Meanwhile, the second edge portion 142 may be the leading edge (and cutting edge) that engages material when the main body portion 100 is rotated in the second direction. By employing different cutting edges for the first edge portion 140 and the second edge portion 142, corresponding different cutting blades may be employed by simply changing the direction at which the working assembly 20 turns. In some cases, the different blades may simply represent a different cutting surface that may be sharper or duller dependent upon the amount of use and materials engaged. However, in other cases, the different blades may actually have different shapes or other physical characteristics as well.

The first edge portion 140 may be configured to perform a first function based on characteristics of the structure of the first edge portion 140 such as the inclusion of one or more teeth, the provision of angled surfaces, sharpened surfaces, straight surfaces or any other of a number of features that may influence the work that can be accomplished with the first edge portion 140 when the blade assembly 25 is rotated so that the first edge portion 140 provides the leading edge of the blade assembly 25 relative to material encountered thereby when the blade assembly 25 is rotated.

Meanwhile, the second edge portion 142 may be configured to perform a second function, different than the first function, based on having one or more different characteristics than the first edge portion 140 relative to the structure of the second edge portion 142. The characteristics of the second edge portion 142 may be different than the first edge portion 140 relative to characteristics such as the inclusion of one or more teeth (i.e., different numbers, sharpness, angles, etc.), the provision of angled surfaces, sharpened surfaces, straight surfaces or any other of a number of features that may influence the work that can be accomplished with the second edge portion 142 when the blade assembly 25 is rotated so that the second edge portion 142 provides the leading edge of the blade assembly 25 relative to material encountered thereby when the blade assembly 25 is rotated.

As shown in FIG. 3, in some example embodiments, the entirety of the blade assembly 25 may be formed from a single unitary component. Thus, for example, the blade assembly 25 may be stamped or molded as a single metallic component. The blade portions 130 may be spaced equidistantly about a periphery of the main body portion 100. Thus, for example, when three blade portions 130 are provided, each blade portion 130 may be disposed 120 degrees away from the next. Likewise, if four blade portions were provided, such blade portions may be expected to be displaced from each other by about 90 degrees.

The first edge portions 140 may be oriented to present substantially the same angle of approach to vegetation that is encountered when the blade assembly 25 is turned in the first direction. The first edge portions 140 may therefore be sequentially rotated through a cutting zone to engage and cut vegetation therein. Similarly, the second edge portions 142 may be oriented to present substantially the same angle of approach to vegetation that is encountered when the blade assembly 25 is turned in the second direction. The second edge portions 142 may therefore be sequentially rotated through a cutting zone to engage and saw or chop vegetation therein. Of note, in some embodiments, the angle of approach for the first edge portion 140 may be different than the angle of approach for the second edge portion 142.

Figure 4:
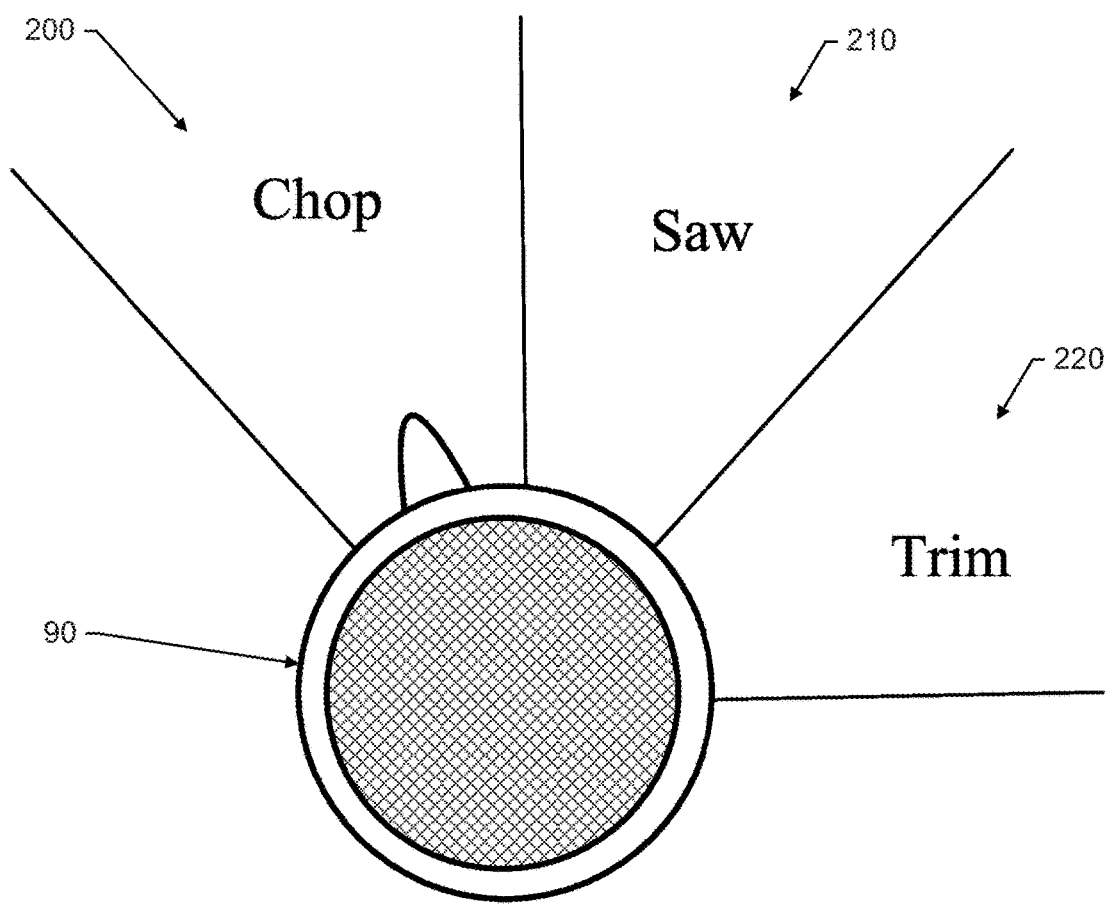
FIG. 4 illustrates a function switch that may be employed according to an example embodiment.

As may be appreciated from the description above, different types of functions may be associated with each different direction of rotation, using the same blade do to the differently structured blade portions. The different types of cutting functions may include chopping, cutting, sawing, mulching, pulverizing, edging, or other like functions. Additionally, it should be appreciated that different speeds of blade rotation may be advantageous for corresponding different functions. Accordingly, in some cases, the operator may select a speed setting and a direction of rotation to employ a desired speed for the selected function associated with the blade that will be employed for the selected direction of rotation. However, in some cases, the trimmer 10 may be configured to enable the operator to select the function, and have the trimmer 10 employ the corresponding speed and direction that best suits the selected function. Thus, for example, the directional switch 70 and/or the speed switch 72 may be augmented or replaced with a function switch 90 (shown in FIG. 4). The function switch 90 may be placed on the control assembly 80 to define a set of selectable zones or positions associated with respective functions (e.g., a first function 200 (e.g., chop), a second function 210 (e.g., saw), a third function 220 (e.g., trim or cut)). Each function may have a corresponding direction of rotation and/or speed associated therewith. Thus, by simply selecting the function, the operator may also (e.g., indirectly) select the speed and/or direction of rotation. As such, for example, the control assembly 80 may be in communication with a switch assembly that employs switching needed to turn the shaft 110 in a given direction (and perhaps also at a given speed) based on the position of the function switch 90. However, in some embodiments, the control assembly 80 may be in communication with a programmable controller that is programmed to direct turning of the shaft 110 in a given direction (and perhaps also at a given speed) based on the position of the function switch 90.

Figure 5:
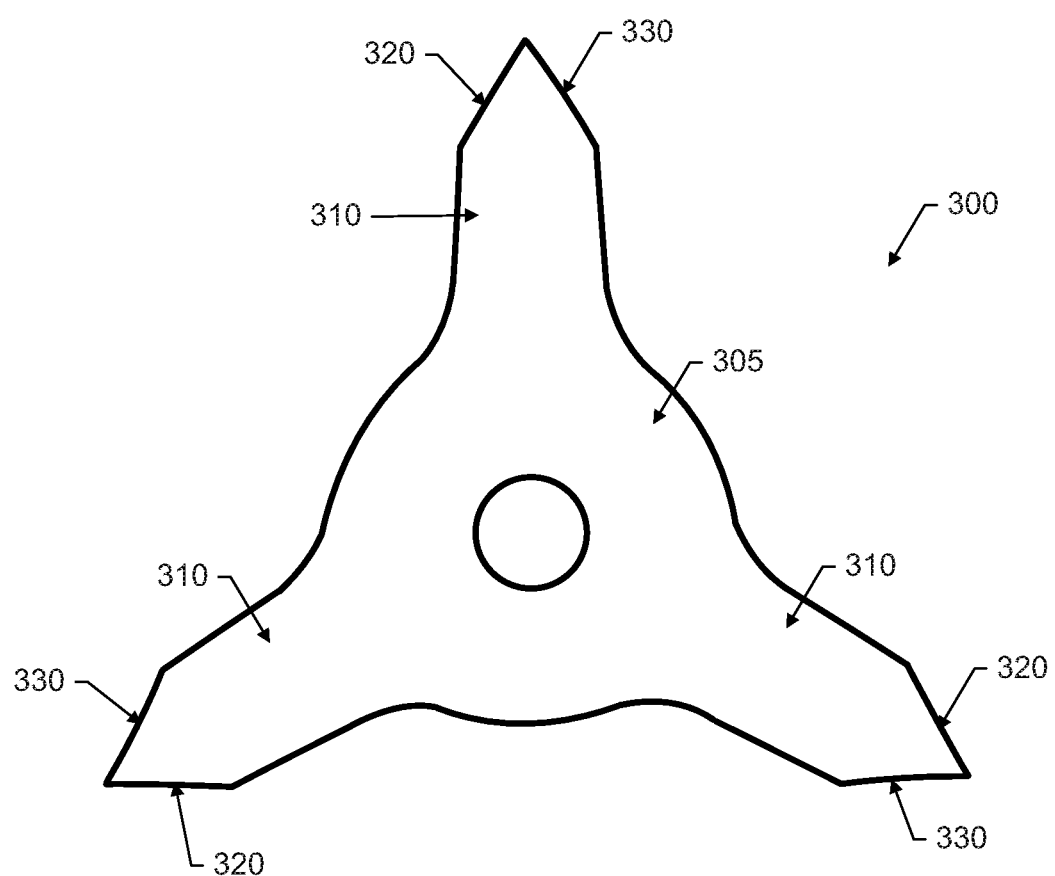
FIG. 5 illustrates a top, plan view of a blade assembly configured to perform the same function when rotated in both directions according to an example embodiment.

As may also be appreciated, different blades or cutting surfaces may be applied for each different direction of rotation. Although, as shown in FIG. 3, the blades may be completely different to the point that such blades perform completely different functions. Some embodiments may employ the same (or similar) blades so that the same function can be performed in each direction, but with a different blade. FIG. 5 provides an example of such a blade. As shown in FIG. 5, a blade assembly 300 having three blade portions 310 may be provided. Although FIG. 3 shows three blade portions 310, it should be appreciated that more or fewer blade portions could be included in alternative embodiments. Each blade portion 310 may extend radially outwardly from a main body portion 305 of the blade assembly 300, and they may be spaced apart equally around a periphery of the main body portion 305. Each blade portion may include a first cutting edge 320 oriented to be a leading edge of the working assembly responsive to rotation of the working assembly in the first direction and a second cutting edge 330 oriented to be a leading edge of the working assembly responsive to rotation of the working assembly in the second direction. The first and second cutting edges 320 and 330 may have substantially a same shape and size or different shape and size. However, the style of blade could generally be the same such that, for example, if the blade is rotated in a first direction for a period of time until the first cutting edge 320 becomes dull, the operator can simply change the direction of rotation of the blade assembly 300 as described above in order to employ a sharper edge (e.g., the second cutting edge 330).

In accordance with an example embodiment, a hand-held cutting device (e.g., a trimmer or edger) is provided. The device may include a working assembly, a motor and a control assembly. The working assembly may be configured to be rotatable in a first direction and a second direction to perform a first function when rotated in the first direction and a second function, different from the first function, when rotated in the second direction. The motor may be operably coupled to the working assembly to rotate the working assembly. The control assembly may be operably coupled to the motor to enable an operator of the device to select a rotation direction for the working assembly. The working assembly may be configured to perform the first and second functions using a single blade assembly.

The device of some embodiments may include additional features that may be optionally added. For example, in some embodiments, (1) a casing may be added, and the casing may be configured to house a battery for powering the device. In some cases, the casing supports the control assembly. In an example embodiment, (2) the control assembly may include a directional switch configured to control whether the working assembly rotates in the first direction or the second direction. In some cases, (3) the control assembly further includes a speed switch configured to control a speed at which the working assembly rotates in the first direction or the second direction. In some embodiments, (4) the control assembly includes a function selection switch identifying a function to be performed by the device. In such an example, a direction of rotation may be selected based on the function to be performed. In an example embodiment, (5) the control assembly may include a function selection switch identifying a function to be performed by the device, and a direction of rotation and corresponding speed of rotation may be selected based on the function to be performed.

In some embodiments, any or all of (1) to (5) may be employed in addition to the optional modifications or augmentations described below. For example, in some embodiments, the blade assembly may include at least three blade portions at each of the at least three blade portions has a first side and a second side, and the first side may be configured for a first type of cutting and the second side may be configured differently from the first side for a second type of cutting. Additionally or alternatively, the blade assembly may include at one blade portion comprising a knife edge for cutting in accordance with the first function when rotated in the first direction and a saw tooth edge for cutting in accordance with the second function when rotated in the second direction. Additionally or alternatively, the blade assembly may include at one blade portion comprising a knife edge for cutting in accordance with the first function when rotated at a first speed in the first direction and a saw tooth edge for cutting in accordance with the second function when rotated at a second speed in the second direction, the first and second speeds being different from each other. Additionally or alternatively, the device further includes an elongated member extending between the working assembly at a first end of the elongated member and the control assembly at a second end of the elongated member. Additionally or alternatively, the device may further include an elongated member extending between the working assembly at a first end of the elongated member and the control assembly at a second end of the elongated member. In such an example, a first handle, a second handle and an operating trigger may each be positioned along the elongated member. Alternatively or additionally, the device may further include an elongated member extending between the working assembly at a first end of the elongated member and the control assembly proximate to a second end of the elongated member. The device may also include a trim shield is disposed proximate to the working assembly to direct clippings substantially perpendicularly away from respective opposite sides of an axis of the elongated member responsive to operation of the working assembly in the first direction or the second direction, respectively. In some embodiments, the blade assembly may include a main body portion for engagement with the device to facilitate turning of the blade assembly, a first edge portion extending from the main body portion and oriented to perform the first function responsive to rotation of the main body portion in the first direction, and a second edge portion extending from the main body portion and oriented to perform the second function responsive to rotation of the main body portion in the second direction. The motor may be an electric motor.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

The invention claimed is:

1. A hand-held cutting device comprising:
   a working assembly comprising:
      a blade assembly configured to be rotatable in a first direction and a second direction without adjusting a mounting of the blade assembly, the blade assembly performing a first function when rotated in the first direction and a second function, different from the first function, when rotated in the second direction;
      a motor operably coupled to the blade assembly to rotate the blade assembly; and
      a control assembly operably coupled to the motor to enable an operator of the device to select a rotation direction for the blade assembly,
   wherein the blade assembly is formed from a single unitary component, and
   wherein the control assembly comprises a function selection switch identifying a function to be performed by the device, and wherein the rotation direction and a corresponding speed of rotation of the blade assembly are selected based on the function identified to be performed.

2. The device of claim 1, further comprising a casing configured to house a battery for powering the device, wherein the casing supports the control assembly.

3. The device of claim 1, wherein the motor is an electric motor.

4. The device of claim 1, wherein the blade assembly comprises at least three blade portions, wherein each of the at least three blade portions has a first side and a second side, and wherein the first side is configured for a first type of cutting and the second side is configured differently from the first side for a second type of cutting.

5. The device of claim 1, wherein the blade assembly comprises at least one blade portion comprising a knife edge for cutting in accordance with the first function when rotated in the first direction and a saw tooth edge for cutting in accordance with the second function when rotated in the second direction.

6. The device of claim 1, wherein the blade assembly comprises at least one blade portion comprising a knife edge for cutting in accordance with the first function when rotated at a first speed in the first direction and a saw tooth edge for cutting in accordance with the second function when rotated at a second speed in the second direction, the first and second speeds being different from each other.

7. The device of claim 1, wherein the device is a trimmer or edger.

8. The device of claim 1, wherein the device further includes an elongated member extending between the working assembly at a first end of the elongated member and the control assembly at a second end of the elongated member.

9. The device of claim 1, wherein the device further includes an elongated member extending between the working assembly at a first end of the elongated member and the control assembly at a second end of the elongated member, and wherein a first handle, a second handle and an operating trigger are each positioned along the elongated member.

10. The device of claim 1, wherein the device further includes an elongated member extending between the working assembly at a first end of the elongated member and the control assembly proximate to a second end of the elongated member, and wherein a trim shield is disposed proximate to the working assembly to direct clippings substantially perpendicularly away from respective opposite sides of an axis of the elongated member responsive to operation of the working assembly in the first direction or the second direction, respectively.

11. The device of claim 1, wherein the blade assembly comprises:
a main body portion for engagement with a shaft of the motor to facilitate turning of the blade assembly;
a first edge portion extending from the main body portion and oriented to perform the first function responsive to rotation of the main body portion in the first direction; and
a second edge portion extending from the main body portion and oriented to perform the second function responsive to rotation of the main body portion in the second direction.

12. A hand-held cutting device comprising:
a working assembly comprising:
a blade assembly configured to be rotatable in a first direction and a second direction without adjusting a mounting of the blade assembly, the blade assembly having a first cutting edge and a second cutting edge;
a motor operably coupled to the blade assembly to rotate the blade assembly; and
a control assembly operably coupled to the motor to enable an operator of the device to select a rotation direction for the blade assembly,
wherein the first cutting edge is configured to engage with an object to be cut via a first angle of approach and is oriented to be a first leading edge of the blade assembly responsive to rotation of the blade assembly in the first direction,
wherein the second cutting edge is configured to engage with the object to be cut via a second angle of approach and is oriented to be a second leading edge of the blade assembly responsive to rotation of the blade assembly in the second direction,
wherein the first and second angles of approach are different, and
wherein the control assembly comprises a function selection switch identifying a function to be performed by the device, and wherein the rotation direction and a corresponding speed of rotation of the blade assembly are selected based on the function identified to be performed.

13. The hand-held cutting device of claim 12, wherein the blade assembly is formed from a single unitary component, the single unitary component being a stamped or molded metallic component.

* * * * *